United States Patent
Bak et al.

(10) Patent No.: US 12,462,887 B2
(45) Date of Patent: Nov. 4, 2025

(54) MEMORY DEVICE INCLUDED IN MEMORY SYSTEM AND METHOD FOR DETECTING FAIL MEMORY CELL THEREOF

(71) Applicant: Samsung Electronics Co., Ltd., Suwon-si (KR)

(72) Inventors: Jungmin Bak, Suwon-si (KR); Junyoung Ko, Suwon-si (KR); Changhwi Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 213 days.

(21) Appl. No.: 18/332,948

(22) Filed: Jun. 12, 2023

(65) Prior Publication Data

US 2024/0079074 A1 Mar. 7, 2024

(30) Foreign Application Priority Data

Sep. 1, 2022 (KR) .......... 10-2022-0110531
Dec. 2, 2022 (KR) .......... 10-2022-0167045

(51) Int. Cl.
*G11C 29/14* (2006.01)
*G11C 7/10* (2006.01)
(Continued)

(52) U.S. Cl.
CPC .......... *G11C 29/022* (2013.01); *G11C 7/1096* (2013.01); *G11C 29/14* (2013.01); *G11C 29/52* (2013.01); *G11C 2029/1202* (2013.01)

(58) Field of Classification Search
CPC ..... G11C 29/022; G11C 7/1096; G11C 29/52; G11C 29/025; G11C 29/08; G11C 29/50;
(Continued)

(56) References Cited

U.S. PATENT DOCUMENTS 7,904,857 B2 3/2011 Wang et al.
8,032,806 B1 10/2011 Tabatabaei
(Continued)

FOREIGN PATENT DOCUMENTS

JP 2010287297 A * 12/2010
KR 101519491 B1 5/2015
(Continued)

*Primary Examiner* — Jay W. Radke
(74) *Attorney, Agent, or Firm* — Wolf, Greenfield & Sacks, P.C.

(57) ABSTRACT

A memory device includes a memory cell array including a plurality of memory cells, a word line defect detection circuit electrically connected to the memory cell array through a plurality of word lines, and control logic configured to control an input/output operation of the memory cell array. When a memory defect detection command is received from a memory controller, the word line defect detection circuit is configured to provide an input voltage to a selected word line among the plurality of word lines, and to generate a fail flag based on a difference between a voltage of the selected word line and a reference voltage. When a mode register read command is received from the memory controller, the control logic is configured to transmit the fail flag and a fail row address corresponding to the fail flag to the memory controller.

20 Claims, 11 Drawing Sheets

(51) Int. Cl.
*G11C 29/02* (2006.01)
*G11C 29/52* (2006.01)
*G11C 29/12* (2006.01)

(58) Field of Classification Search
CPC ............ G11C 29/76; G11C 2029/1202; G11C 2029/5006
See application file for complete search history.

(56) References Cited

U.S. PATENT DOCUMENTS

| | | |
|---|---|---|
| 8,289,770 B2 | 10/2012 | Lee et al. |
| 9,679,664 B2 | 6/2017 | Ong |

FOREIGN PATENT DOCUMENTS

| | | |
|---|---|---|
| KR | 101848480 B1 | 4/2018 |
| KR | 101898885 B1 | 9/2018 |
| KR | 102076584 B1 | 4/2020 |

\* cited by examiner

MEMORY DEVICE INCLUDED IN MEMORY SYSTEM AND METHOD FOR DETECTING FAIL MEMORY CELL THEREOF

CROSS-REFERENCE TO RELATED APPLICATIONS

This application claims priority under 35 U.S.C. § 119 to Korean Patent Application No. 10-2022-0110531, filed on Sep. 1, 2022, and Korean Patent Application No. 10-2022-0167045, filed on Dec. 2, 2022 in the Korean Intellectual Property Office, the disclosures of which are incorporated by reference herein in their entireties.

Embodiments of the present disclosure relate to a memory device included in a memory system, and more particularly, relate to a method of operating a memory device to detect a fail memory cell of the memory device.

BACKGROUND

Semiconductor memory devices may be generally classified into a volatile semiconductor memory device and a non-volatile semiconductor memory device. The volatile semiconductor memory device may have relatively fast read and write speeds, but lose data stored therein when power is not supplied thereto. In contrast, even though power is interrupted, information stored in the non-volatile semiconductor memory device does not disappear. For this reason, the non-volatile semiconductor memory device is used to store information that has to be retained regardless of whether power is supplied thereto.

A representative example of the volatile memory is a dynamic random access memory (DRAM). A memory cell of the volatile memory device (e.g., a DRAM) may include one NMOS transistor serving as a switch and one capacitor storing electric charges (data). The binary information "1" or "0" may correspond to the presence or absence of the electric charge stored in the capacitor in the memory cell, that is, whether a terminal voltage of the cell capacitor is high or low. The memory cell may be connected to a word line and a bit line. The bit line may be connected to a sense amplifier. The sense amplifier may sense data stored in the memory cell through the bit line based on a voltage applied to the word line.

In general, a memory controller may perform an operation of detecting an error in memory cells included in a volatile memory and restoring an error-detected memory cell. The memory controller may determine whether a memory cell has an error by writing dummy data in a memory cell included in the volatile memory, reading the stored dummy data, and comparing the read dummy data with reference data. However, in this method, since the time for detecting the failed memory cell may include the time to write dummy data in the failed memory cell and the time to read the stored dummy data, it may require significant time for the memory controller to detect the failed memory cell.

SUMMARY

Embodiments of the present disclosure provide a memory device configured for detecting a defect in a memory cell based on a leakage current of a word line without a write operation or a read operation of the memory device, and a method for detecting a failed or defective memory cell thereof.

According to an embodiment of the present disclosure, a memory device includes a memory cell array including a plurality of memory cells, a word line defect detection circuit electrically connected to the memory cell array through a plurality of word lines, and control logic that is configured to control an input/output operation of the memory cell array. Responsive to receiving a memory defect detection command from a memory controller, the word line defect detection circuit is configured to provide an input voltage to a selected word line among the plurality of word lines, and is configured to generate a fail flag based on a difference between a voltage of the selected word line and a reference voltage, and responsive to receiving a mode register read command from the memory controller, the control logic is configured to transmit the fail flag and a fail row address corresponding to the fail flag to the memory controller.

According to an embodiment, the memory device may further include a first mode register configured to store the fail flag, and a second mode register be configured to store the fail row address.

According to an embodiment, the word line defect detection circuit may be configured to store a first fail flag in the first mode register when the voltage of the selected word line is less than or equal to the reference voltage, and may be configured to store a second fail flag in the first mode register when the voltage of the selected word line exceeds the reference voltage.

According to an embodiment, the control logic may be configured to store the fail row address in the second mode register when the first fail flag is stored in the first mode register.

According to an embodiment, the control logic may be configured to not store the fail row address when the second fail flag is stored in the first mode register.

According to an embodiment, the control logic may be configured to transmit the first fail flag or the second fail flag stored in the first mode register to the memory controller when a first mode register read command is received.

According to an embodiment, when a second mode register read command is received after transmitting the first fail flag in response to the first mode register read command, the control logic may be configured to transmit the fail row address stored in the second mode register to the memory controller.

According to an embodiment, when the fail row address is greater than a specified size, the control logic may be configured to transmit an additional fail row address to the memory controller in response to a third mode register read command received after receiving the second mode register read command.

According to an embodiment, when the first fail flag is stored in the first mode register, the control logic may be configured to internally perform a write operation of the fail row address associated with the second mode register regardless of a command from the memory controller.

According to an embodiment, the mode register read command may be received after the memory defect detection command is received and after a specified time elapses, and the specified time may be based on a time required for a write operation of the fail row address.

According to an embodiment of the present disclosure, a method of detecting a fail memory cell of a memory device includes receiving a memory defect detection command from a memory controller, generating a fail flag based on a difference between a voltage of a selected word line among a plurality of word lines of the memory device and a reference voltage in response to the memory defect detection command, storing the fail flag in a first mode register of the memory device, and storing a fail row address corresponding to the fail flag in a second mode register of the memory device.

According to an embodiment, the method of detecting the fail memory cell may further include receiving a first mode register read command from the memory controller, and transmitting the fail flag stored in the first mode register to the memory controller in response to the first mode register read command.

According to an embodiment, the method of detecting the fail memory cell may further include receiving a second mode register read command from the memory controller when the fail flag indicates a word line fail, and transmitting the fail row address stored in the second mode register to the memory controller in response to the second mode register read command.

According to an embodiment, the generating of the fail flag may include generating a first fail flag when the voltage of the selected word line is less than or equal to the reference voltage, and generating a second fail flag when the voltage of the selected word line exceeds the reference voltage.

According to an embodiment, the storing of the fail row address in the second mode register may include storing the fail row address when the first fail flag is stored in the first mode register, and not storing the fail row address when the second fail flag is stored in the first mode register.

According to an embodiment of the present disclosure, a memory system includes a memory device including a plurality of memory cells, and a memory controller configured to control an input/output operation of the memory device. The memory device is configured to perform a defect detection operation of the plurality of memory cells responsive to a memory defect detection command received from the memory controller, and is configured to generate a fail flag indicating current leakage of one or more word lines electrically connected to the plurality of memory cells through the defect detection operation. The memory controller is configured to receive the fail flag or a fail row address corresponding to the fail flag from the memory device in response to a mode register read command transmitted after the memory defect detection command and after a specified time elapses.

According to an embodiment, the memory device may be configured to select one of the word lines based on the memory defect detection command, store a first fail flag in a first mode register when a voltage of the selected word line is less than or equal to a reference voltage, store a second fail flag in the first mode register when the voltage of the selected word line exceeds the reference voltage, and store the fail row address in a second mode register when the first fail flag is stored in the first mode register.

According to an embodiment, the memory device may be configured to transmit the first fail flag or the second fail flag when a first mode register read command is received, and the memory controller may be configured to transmit a second mode register read command when the first fail flag is received in response to the first mode register read command.

According to an embodiment, the memory device may be configured to transmit the fail row address when the second mode register read command is received.

According to an embodiment, the memory controller may restore a fail memory cell of the memory device based on the fail row address by mapping a logical address that was mapped to the fail row address to a physical address corresponding to a dummy memory cell.

BRIEF DESCRIPTION OF THE FIGURES

A detailed description of each drawing is provided to facilitate a more thorough understanding of the drawings referenced in the detailed description of the present disclosure.

DETAILED DESCRIPTION OF EMBODIMENTS

Hereinafter, embodiments of the present disclosure may be described in detail and clearly to such an extent that an ordinary one in the art easily implements the present disclosure. The terms "comprises," "comprising," "includes" and/or "including," when used herein, specify the presence of stated elements, but do not preclude the presence of additional elements. The term "and/or" includes any and all combinations of one or more of the associated listed items.

In addition, hereinafter, a DRAM may be used as an example of a semiconductor device for describing features and functions of the present disclosure. However, a person skilled in the art may easily appreciate other advantages and performance of the present disclosure depending on the content disclosed here. The present disclosure may be implemented or applied through other embodiments. In addition, the detailed description may be changed or modified depending on viewpoints and applications without departing from the claims, the scope and spirit, and any other purposes of the present disclosure.

Figure 1:
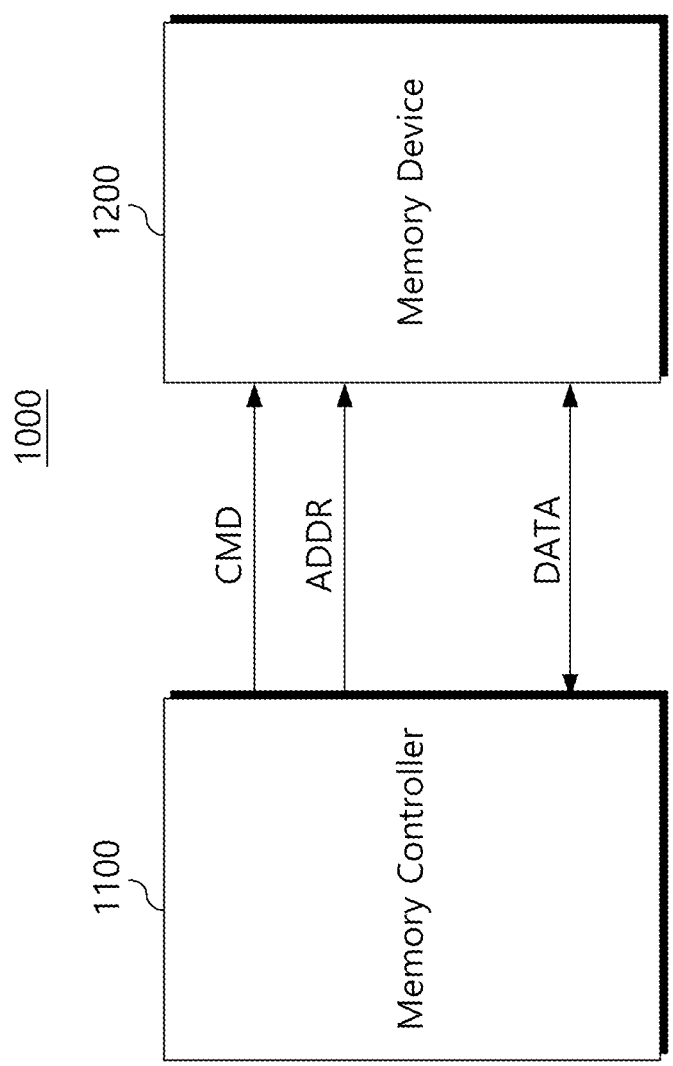
FIG. 1 is a block diagram illustrating a memory system according to some embodiments.

FIG. 1 is a block diagram illustrating a memory system, according to an embodiment. Referring to FIG. 1, a memory system 1000 of the present disclosure may include a memory controller 1100 and a memory device 1200.

According to an embodiment, the memory controller 1100 may perform an access operation for writing data to the memory device 1200 or reading data stored in the memory device 1200. For example, the memory controller 1100 may generate a command CMD and an address ADDR for writing data to the memory device 1200 or reading data stored in the memory device 1200. The memory controller 1100 may be at least one of a memory controller for controlling the memory device 1200, a System-on-Chip (SoC) such as an application processor (AP), a central processing unit (CPU), a digital signal processor (DSP), and a graphics processing unit (GPU).

According to an embodiment, the memory controller 1100 may control the overall operation of the memory device 1200 by providing various signals to the memory device 1200. For example, the memory controller 1100 may control a memory access operation of the memory device 1200 such as a read operation and a write operation. The memory controller 1100 provides the command CMD and the address ADDR to the memory device 1200 to write data DATA to the memory device 1200 or to read data DATA from the memory device 1200.

According to an embodiment, the memory controller 1100 may generate various types of commands CMD to control the memory device 1200. For example, the memory controller 1100 may generate a bank request corresponding to a bank operation of changing states of a memory bank included in memory banks to read or write data DATA. As an example, the bank request may include an active request for changing a state of the memory bank included in the memory banks to an active state. The memory device 1200 may activate a row included in the memory bank, that is, a word line, in response to the active request. The bank request may include a precharge request for changing the memory banks from an active state to a standby state after reading or writing of data DATA is completed. In addition, the memory controller 1100 may generate an I/O request (e.g., a CAS request) for performing a read operation or a write operation of data DATA in the memory device 1200. For example, the input/output request may include a read request for reading data DATA from activated memory banks. The input/output request may include a write request for writing data DATA to the activated memory banks. Also, the memory controller 1100 may generate a refresh command for controlling a refresh operation with respect to the memory banks. However, the types of commands CMD described herein are an example, and other types of commands CMD may exist.

According to an embodiment, the memory device 1200 may output data DATA requested to be read by the memory controller 1100 to the memory controller 1100 or may store data DATA requested to be written by the memory controller 1100 in a memory cell. The memory device 1200 may input/output data DATA based on the command CMD and the address ADDR. The memory device 1200 may include memory banks.

In this case, the memory device 1200 may be a volatile memory device such as a dynamic random access memory (DRAM), a synchronous dynamic random access memory (SDRAM), a double data rate (DDR) DRAM, a DDR SDRAM, a low power double data rate (LPDDR) SDRAM, a graphics double data rate (GDDR) SDRAM, a rambus dynamic random access memory (RDRAM), and a static random access memory (SRAM). Alternatively, the memory device 1200 may also be implemented in a non-volatile memory device such as a resistive RAM (RRAM), a phase change memory (PRAM), a magnetoresistive memory (MRAM), a ferroelectric memory (FRAM), a spin injection magnetization inversion memory (STT-RAM), etc. In the present specification, the advantages of the present disclosure are described based on DRAM, but the technical spirit of the present disclosure is not limited thereto.

According to an embodiment, memory banks may include a memory cell array divided in units of banks, a row decoder, a column decoder, a sense amplifier, a write driver, etc. The memory banks may store data DATA requested to be written in the memory device 1200 through the write driver, and may read data DATA requested to be read using the sense amplifier. In addition, a configuration for a refresh operation for storing and maintaining data in the cell array or selection circuits according to address may be further included.

According to an embodiment, the memory system 1000 may detect whether a memory cell is defective based on a leakage current of a word line connected to a memory cell included in the memory device 1200. For example, the memory controller 1100 may transmit a memory defect detection command instructing the memory device 1200 to compare a voltage of an activated word line with a reference voltage through a command line. The memory device 1200 may generate a fail flag including word line defect information based on the memory defect detection command and may store a fail row address corresponding to the fail flag. The memory device 1200 may transmit the fail flag or the fail row address through a data line in response to a request of the memory controller 1100.

Figure 2:
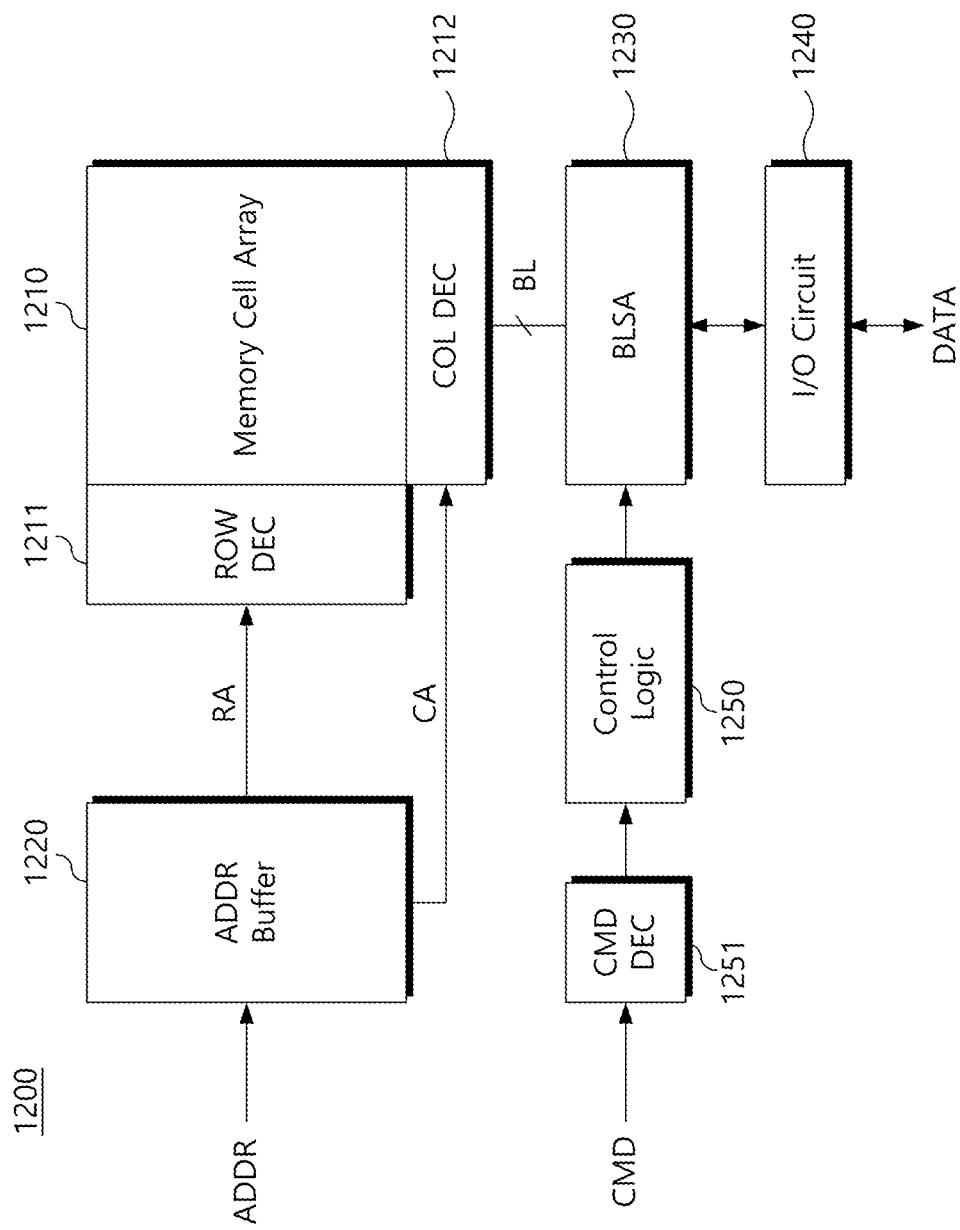
FIG. 2 is a block diagram illustrating a memory device of FIG. 1.

FIG. 2 is a block diagram illustrating a memory device of FIG. 1. Referring to FIG. 2, the memory device 1200 may include a memory cell array 1210, a row decoder 1211, a column decoder 1212, an address buffer 1220, a bit line sense amplifier 1230, an input/output circuit 1240, a command decoder 1251, and control logic 1250.

According to an embodiment, the memory cell array 1210 may include a plurality of memory cells provided in a matrix form arranged in rows and columns. For example, the memory cell array 1210 may include a plurality of word lines and a plurality of bit lines BL connected to memory cells. The plurality of word lines may be connected to rows of memory cells, and the plurality of bit lines BL may be connected to columns of memory cells. The term "connected to" may be used herein to refer to a physical and/or electrical connection. When components or layers are referred to as "directly on" or "directly connected," no intervening components or layers are present.

According to an embodiment, the address buffer 1220 may receive an address ADDR from the memory controller 1100 of FIG. 1. For example, the address ADDR may include a row address RA addressing a row of the memory cell array 1210 and a column address CA addressing a column of the memory cell array 1210. The address buffer 1220 may transmit the row address RA to the row decoder 1211 and may transmit the column address CA to the column decoder 1212.

According to an embodiment, the row decoder 1211 may select any one of the plurality of word lines connected to the memory cell array 1210. The row decoder 1211 may decode the row address RA received from the address buffer 1220, may select one word line corresponding to the row address RA, and may activate the selected word line.

According to an embodiment, the column decoder 1212 may select a specified bit line from among the plurality of bit lines BL of the memory cell array 1210. The column decoder 1212 may decode the column address CA received from the address buffer 1220 to select the specified bit line BL corresponding to the column address CA.

According to an embodiment, the bit line sense amplifier 1230 may be connected to the bit lines BL of the memory cell array 1210. For example, the bit line sense amplifier 1230 may sense a voltage change of a selected bit line among the plurality of bit lines BL, and may amplify and output the voltage change. The input/output circuit 1240 may output data DATA output based on the sensed amplified voltage from the bit line sense amplifier 1230 to the memory controller 1100 through data lines.

According to an embodiment, the command decoder 1251 may decode a write enable signal (/WE), a row address strobe signal (/RAS), a column address strobe signal (/CAS), and a chip select signal received from the memory controller 1100 such that control signals corresponding to the command CMD are generated in the control logic 1250. The command CMD may include an active request, a read request, a write request, or a precharge request. The control logic 1250 may control the overall operation of the bit line sense amplifier 1230 through the control signals corresponding to the command CMD.

According to an embodiment, the memory device 1200 may detect whether a memory cell is defective based on a leakage current of a word line connected to a memory cell included in the memory cell array 1210. For example, the memory device 1200 may receive a memory defect detection command instructing to compare a voltage of an activated word line with a reference voltage from the memory controller 1100 through a command line. The memory device 1200 may generate a fail flag including word line defect information based on the memory defect detection command and may store a fail row address corresponding to the fail flag. When generating the fail flag, the row decoder 1211 may identify a fail row address corresponding to the fail flag. The memory device 1200 may transmit the fail flag or the fail row address through a data line in response to a request of the memory controller 1100, thereby identifying the defective memory cell(s) without performing a write and read operation.

Figure 3:
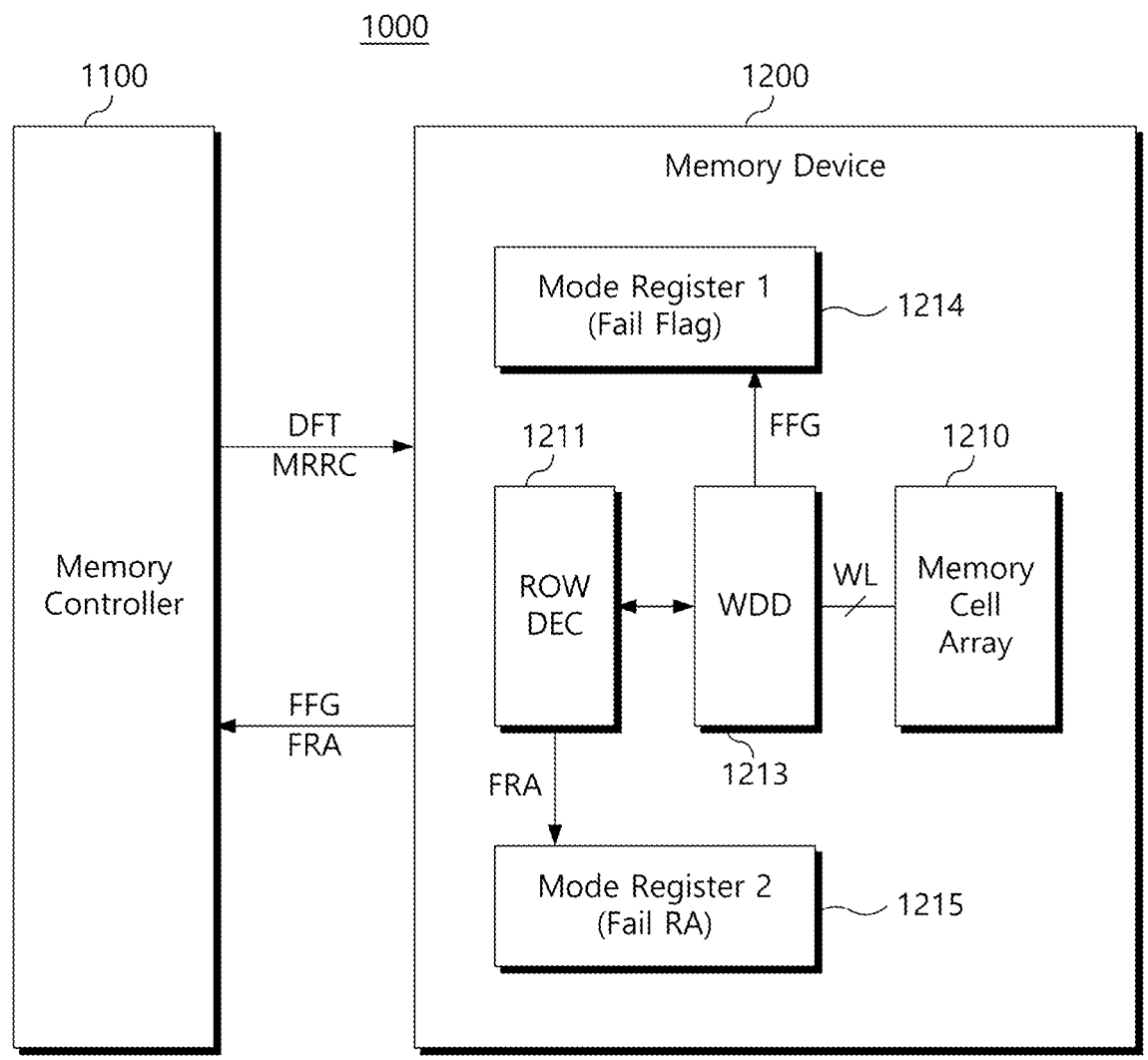
FIG. 3 is a block diagram illustrating a memory system of FIG. 1 performing a memory defect detection operation according to some embodiments.

FIG. 3 is a block diagram illustrating a memory system of FIG. 1 performing a memory defect detection operation. Referring to FIG. 3, the memory system 1000 may include a memory controller 1100 and the memory device 1200. The memory device 1200 may include the components illustrated in FIG. 2. In addition, the memory device 1200 may include a word line defect detection circuit 1213 connected to the memory cell array 1210 and the row decoder 1211, a first mode register 1214, and a second mode register 1215. The first mode register 1214 and the second mode register 1215 may be included in the control logic 1250 of FIG. 2 or may be provided separately. The row decoder 1211, the word line defect detection circuit 1213, the first mode register 1214, and the second mode register 1215 may be controlled by the control logic 1250. The terms "first," "second," etc., may be used herein merely to distinguish one component, layer, direction, etc. from another.

According to an embodiment, the memory system 1000 may perform a memory defect detection operation. For example, the memory device 1200 may perform the memory defect detection operation under a control of the memory controller 1100. The memory controller 1100 may transmit a memory defect detection command DFT to the memory device 1200 through a command line. When the memory device 1200 receives the memory defect detection command DFT, the word line defect detection circuit 1213 may determine whether word lines WL connected to the memory cell array 1210 leak a current. When current leakage is detected among the word lines WL, the word line defect detection circuit 1213 may store a fail flag FFG (e.g., a first fail flag) indicating a word line defect in the first mode register 1214. In addition, when current leakage is detected among the word lines WL, the row decoder 1211 may store a fail row address FRA corresponding to the fail flag FFG in the second mode register 1215. In contrast, when there is no current leakage detected among the word lines WL, the word line defect detection circuit 1213 may store the fail flag FFG (e.g., a second fail flag) indicating that the word line is normal (i.e., not defective) in the first mode register 1214. However, when no current leakage is detected among the word lines WL, the fail row address FRA may not be stored in the second mode register 1215.

According to an embodiment, the memory system 1000 may perform a memory defect identifying operation. For example, the memory device 1200 may transmit defect word line information detected under the control of the memory controller 1100 to the memory controller 1100. After the memory defect detection command DFT is transmitted and a specified time elapses, the memory controller 1100 may transmit a mode register read command MRRC (e.g., a first mode register read command) to the memory device 1200 through a command line. When the mode register read command MRRC is received, the memory device 1200 may transmit the fail flag FFG stored in the first mode register 1214 to the memory controller 1100 through a data line. The memory controller 1100 may identify the received fail flag FFG. When the received fail flag FFG is the fail flag FFG (e.g., a first fail flag) indicating a word line defect, the memory controller 1100 may transmit another mode register read command MRRC (e.g., a second mode register) to the memory controller 1100. When another mode register read command MRRC is received, the memory device 1200 may transmit the fail row address FRA (or the fail row address FRA corresponding to the fail flag FFG) stored in the second mode register 1215 to the memory controller 1100. Meanwhile, when the received fail flag FFG is the fail flag FFG (e.g., the second fail flag) indicating that the word line is normal, the memory controller 1100 may periodically transmit the memory defect detection command DFT without transmitting another mode register read command MRRC (e.g., a second mode register read command).

According to an embodiment, the memory system 1000 may perform a defect memory restoring operation. For example, when the fail flag FFG (e.g., a first fail flag) indicating a word line defect and the fail row address FRA corresponding to the fail flag FFG are received, the memory controller 1100 may allow at least one memory cell corresponding to the fail row address FRA to be replaced with a dummy memory cell. For example, the memory controller 1100 may map a logical address mapped to the fail row address FRA to a physical address corresponding to a dummy memory cell. The memory controller 1100 may allow the fail row address FRA to be blocked.

Figure 4:
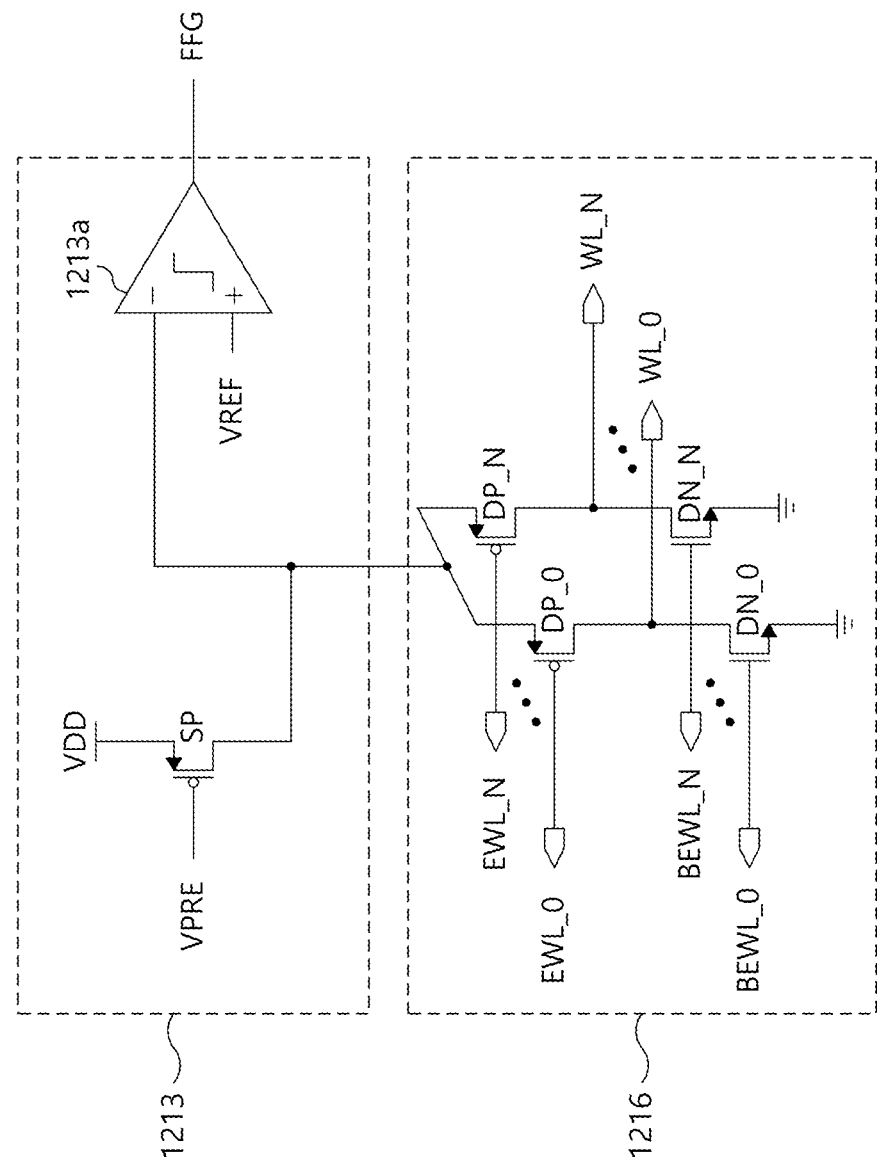
FIG. 4 is a diagram illustrating a word line defect detection circuit of FIG. 3 according to some embodiments by way of example.

FIG. 4 is a diagram illustrating a word line defect detection circuit of FIG. 3 by way of example. Referring to FIGS. 3 and 4, the word line defect detection circuit 1213 may detect whether a memory cell is defective based on a leakage current of a word line. Word lines WL (e.g., WL_0 to WL_N) connected to the memory cell array 1210 may be connected to a word line driver 1216, and the word line defect detection circuit 1213 may be connected to the word line driver 1216. For example, the word line driver 1216 may be included in the memory cell array 1210 or may be provided separately.

According to an embodiment, the word line driver 1216 may include drive transistors providing a power supply voltage VDD to each of the word lines (e.g., WL_0 to WL_N). For example, the drive transistors may include PMOS transistors DP_0 to DP_N and NMOS transistors DN_0 to DN_N. As an example, one word line (e.g., WL_0) may be enabled by one PMOS transistor (e.g., DP_0) and one NMOS transistor (e.g., DN_0). A drain of one PMOS transistor (e.g., DP_0) and a drain of one NMOS transistor (e.g., DN_0) may be connected to one word line (e.g., WL_0). A source of one NMOS transistor (e.g., DN_0) may be connected to a ground terminal. Each of the PMOS transistors DP_0 to DP_N may be turned on or off by word line enable signals EWL_0 to EWL_N, respectively. Each of the NMOS transistors DN_0 to DN_N may be turned on or off by the inverted word line enable signals BEWL_0 to BEWL_N, respectively.

According to an embodiment, the word line defect detection circuit 1213 may include a switching transistor SP and a comparator 1213a. For example, the switching transistor SP may supply the power supply voltage VDD to sources of the PMOS transistors DP_0 to DP_N based on a preparation voltage VPRE. The comparator 1213a may output the fail flag FFG by comparing a voltage of an activated word line with a reference voltage VREF.

According to an embodiment, when the memory device 1200 receives the memory defect detection command DFT, the word line defect detection circuit 1213 may detect whether each word line is defective. For example, the switching transistor SP of the word line defect detection circuit 1213 may be turned on, and the power supply voltage VDD may be supplied to sources of the PMOS transistors DP_0 to DP_N. The switching transistor SP of the word line defect detection circuit 1213 may be turned off, and one of word lines (e.g., WL_0 to WL_N) may be activated. For example, when the PMOS transistor DP_0 and the NMOS transistor DN_0 are turned on based on the word line enable signal EWL_0 and the inverted word line enable signal BEWL_0, the word line WL_0 may be activated. In this case, when a memory cell connected to the word line WL_0 has a defect, a leakage current occurs through the word line WL_0 and then a voltage of the word line WL_0 may decrease. The comparator 1213a may compare the voltage of the word line WL_0 connected through the PMOS transistor DP_0 with the reference voltage VREF. When the voltage of the word line WL_0 is equal to or less than the reference voltage VREF, the comparator 1213a may output the fail flag FFG (e.g., the first fail flag) indicating a word line defect. When the voltage of the word line WL_0 exceeds the reference voltage VREF, the comparator 1213a may output the fail flag FFG (e.g., the second fail flag) indicating that the word line is normal. As in the above description, the word line defect detection circuit 1213 may determine whether each of the word lines (e.g., WL_0 to WL_N) is defective, and may output the corresponding fail flag FFG.

Figure 5:
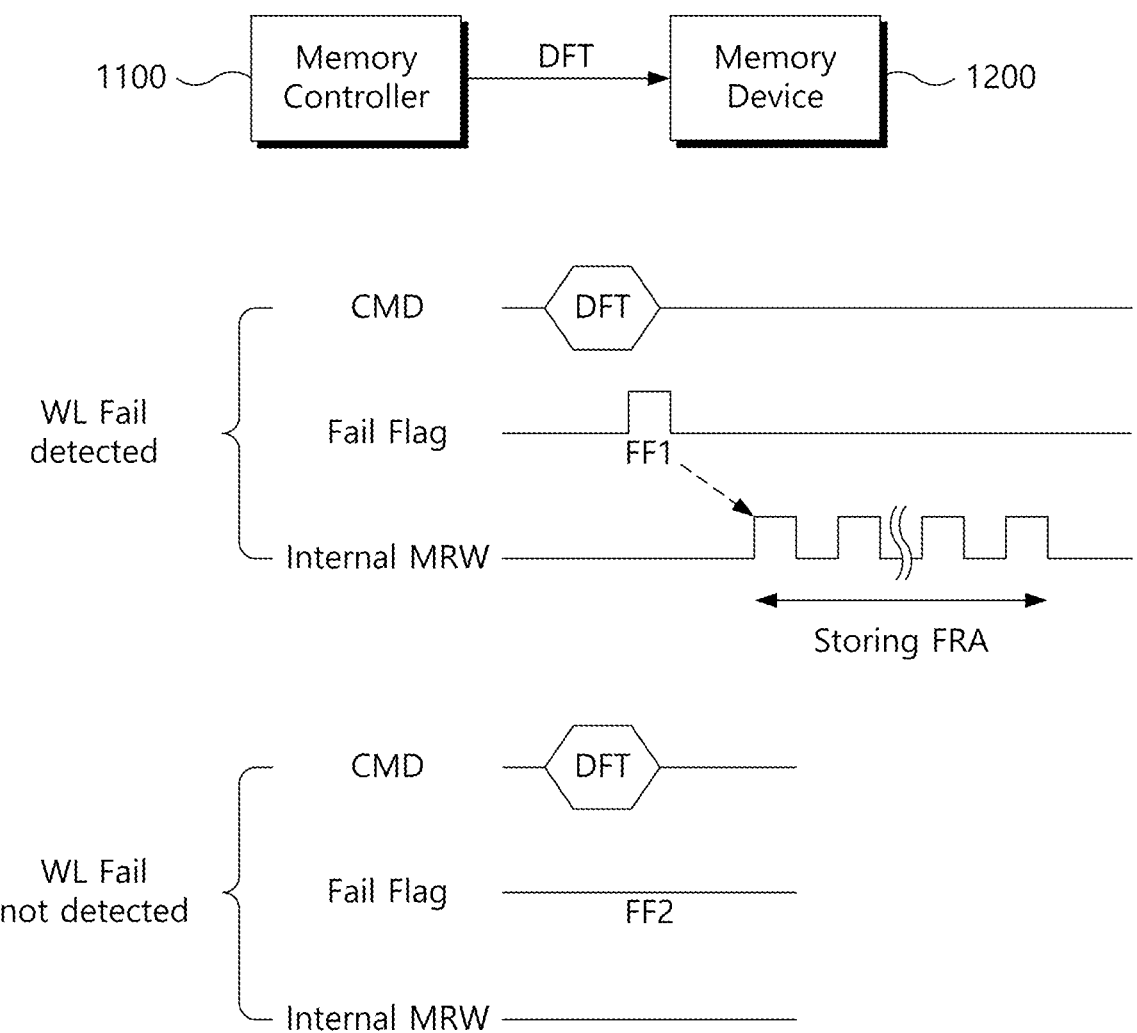
FIG. 5 is a timing diagram illustrating a memory defect detection operation of a memory system of FIG. 3 according to some embodiments.

FIG. 5 is a timing diagram illustrating a memory defect detection operation of a memory system of FIG. 3. Referring to FIGS. 3 and 5, the memory device 1200 may detect whether a memory cell is defective based on leakage current of a word line. The memory controller 1100 may transmit the memory defect detection command DFT to the memory device 1200 through a command line. For example, the memory controller 1100 may periodically transmit the memory defect detection command DFT to detect a defect of a memory cell in the memory device 1200. When the memory defect detection command DFT is received, the word line defect detection circuit 1213 of the memory device 1200 may output the fail flag FFG according to the method described with reference to FIG. 4.

According to an embodiment, when a memory cell connected to a word line has a defect, the word line defect detection circuit 1213 may output a first fail flag FF1 (e.g., logic 1) indicating a word line defect. The first mode register 1214 may store the first fail flag FF1. When the first fail flag FF1 occurs, the row decoder 1211 may transfer the fail row address FRA corresponding to the first fail flag FF1 internally of the memory device 1200 to the second mode register 1215. The second mode register 1215 may store the fail row address FRA corresponding to the first fail flag FF1.

According to an embodiment, when there is no defect in the memory cell connected to the word line, the word line defect detection circuit 1213 may output a second fail flag FF2 (e.g., logic 0) indicating that the word line is normal. When there is no defect in the memory cell connected to a word line, the row decoder 1211 does not output the fail row address FRA, and the word line defect detection circuit 1213 may proceed to detect a defect of a subsequent word line.

As described above, the memory device 1200 may detect whether a memory cell connected to a word line is defective based on the leakage current of the word line. Accordingly, the memory device 1200 may detect whether a memory cell is defective through a bank request (e.g., the memory defect detection command DFT) for activating a word line, rather than through a write operation and a read operation. Accordingly, the memory defect detection method of the memory device 1200 may reduce time and power consumption compared to a method of detecting a memory cell defect through a write operation and a read operation of the memory cell.

Figure 6:
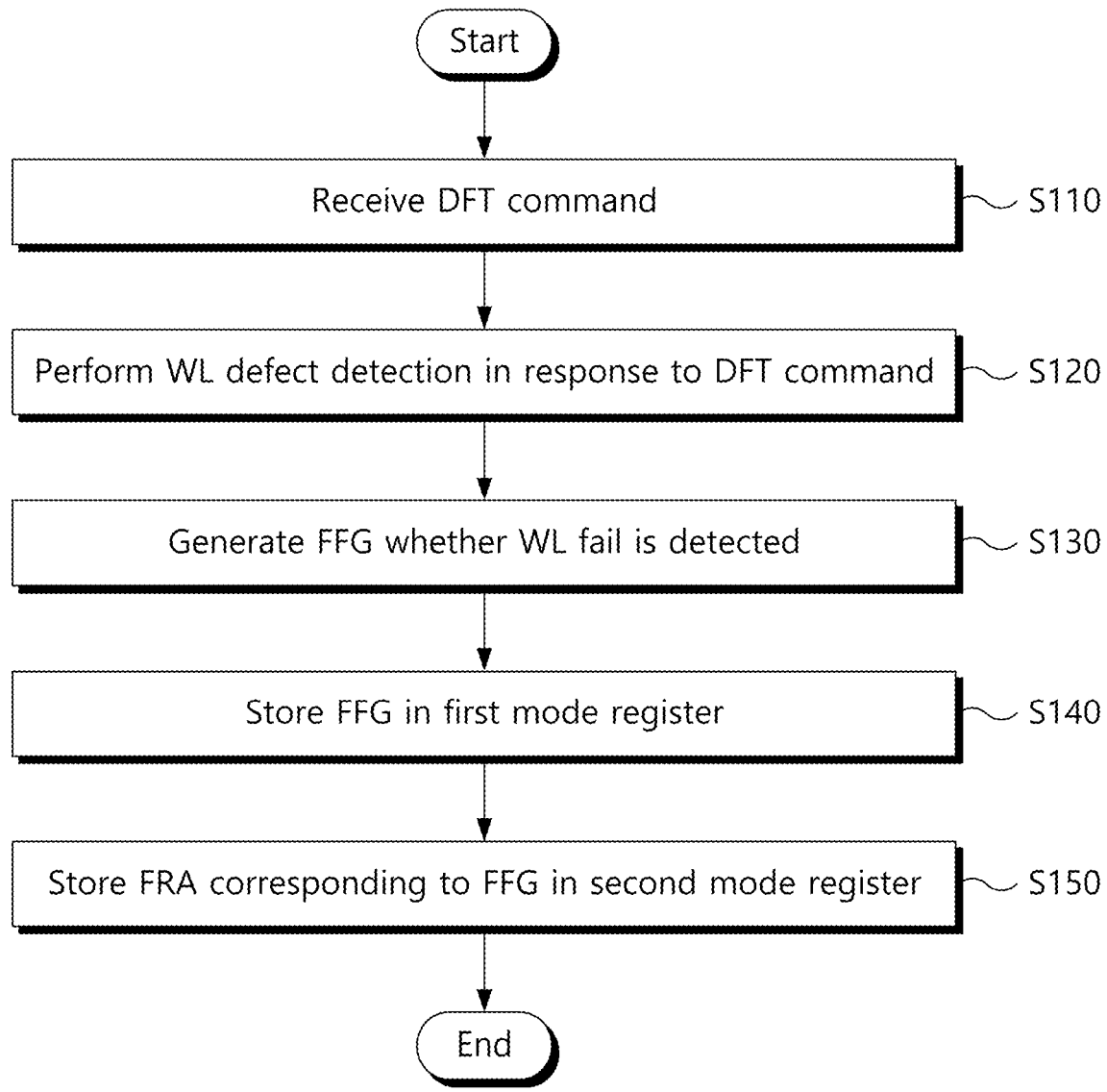
FIG. 6 is a flowchart illustrating a memory defect detection operation of a memory system of FIG. 3 according to some embodiments.

FIG. 6 is a timing diagram illustrating a memory defect detection operation of a memory system of FIG. 3. Referring to FIGS. 3 to 6, the memory device 1200 may perform a memory defect detection operation under the control of the memory controller 1100. The memory device 1200 may detect whether a memory cell is defective based on a leakage current of a word line.

According to an embodiment, in operation S110, the memory device 1200 may receive the memory defect detection command DFT. For example, the memory controller 1100 may periodically transmit the memory defect detection command DFT to the memory device 1200.

According to an embodiment, in operation S120, the memory device 1200 may perform a word line defect detection operation in response to the memory defect detection command DFT. For example, when the memory defect detection command DFT is received, the word line defect detection circuit 1213 of the memory device 1200 may apply the input voltage VDD for each word line, and may compare the voltage of the word line with the reference voltage VREF. When a leakage current occurs due to a defect in a memory cell connected to the word line, the voltage of the word line may drop below the reference voltage VREF. When the memory cell connected to the word line is normal, the voltage of the word line may be maintained higher than the reference voltage VREF.

According to an embodiment, in operation S130, the memory device 1200 may generate the fail flag FFG according to whether a word line fail is detected. For example, when the voltage of the word line is equal to or less than the reference voltage VREF, the word line defect detection circuit 1213 may output the first fail flag FF1 indicating a word line fail. When the voltage of the word line exceeds the reference voltage VREF, the word line defect detection circuit 1213 may output the second fail flag FF2 indicating that the word line is normal.

According to an embodiment, in operation S140, the memory device 1200 may store the generated fail flag FFG in the first mode register 1214. For example, when the voltage of the word line is less than or equal to the reference voltage VREF (i.e., when or indicating that the memory cell connected to the word line has a defect), the memory device 1200 may store the first fail flag FF1 in the first mode register 1214. When the voltage of the word line exceeds the reference voltage VREF (i.e., when or indicating that the memory cell connected to the word line is not defective), the memory device 1200 may store the second fail flag FF2 to the first mode register 1214.

According to an embodiment, in operation S150, the memory device 1200 may store the fail row address FRA corresponding to the fail flag FFG in the second mode register 1215. For example, when the voltage of the word line is less than or equal to the reference voltage VREF (i.e., when or indicating that the memory cell connected to the word line is defective), the memory device 1200 may store the fail row address FRA corresponding to the first fail flag FF1 in the second mode register 1215. When the voltage of the word line exceeds the reference voltage VREF (i.e., when or indicating that the memory cell connected to the word line is not defective), the memory device 1200 may not store anything (e.g., may not store a fail row address FRA) in the second mode register 1215.

Figure 7:
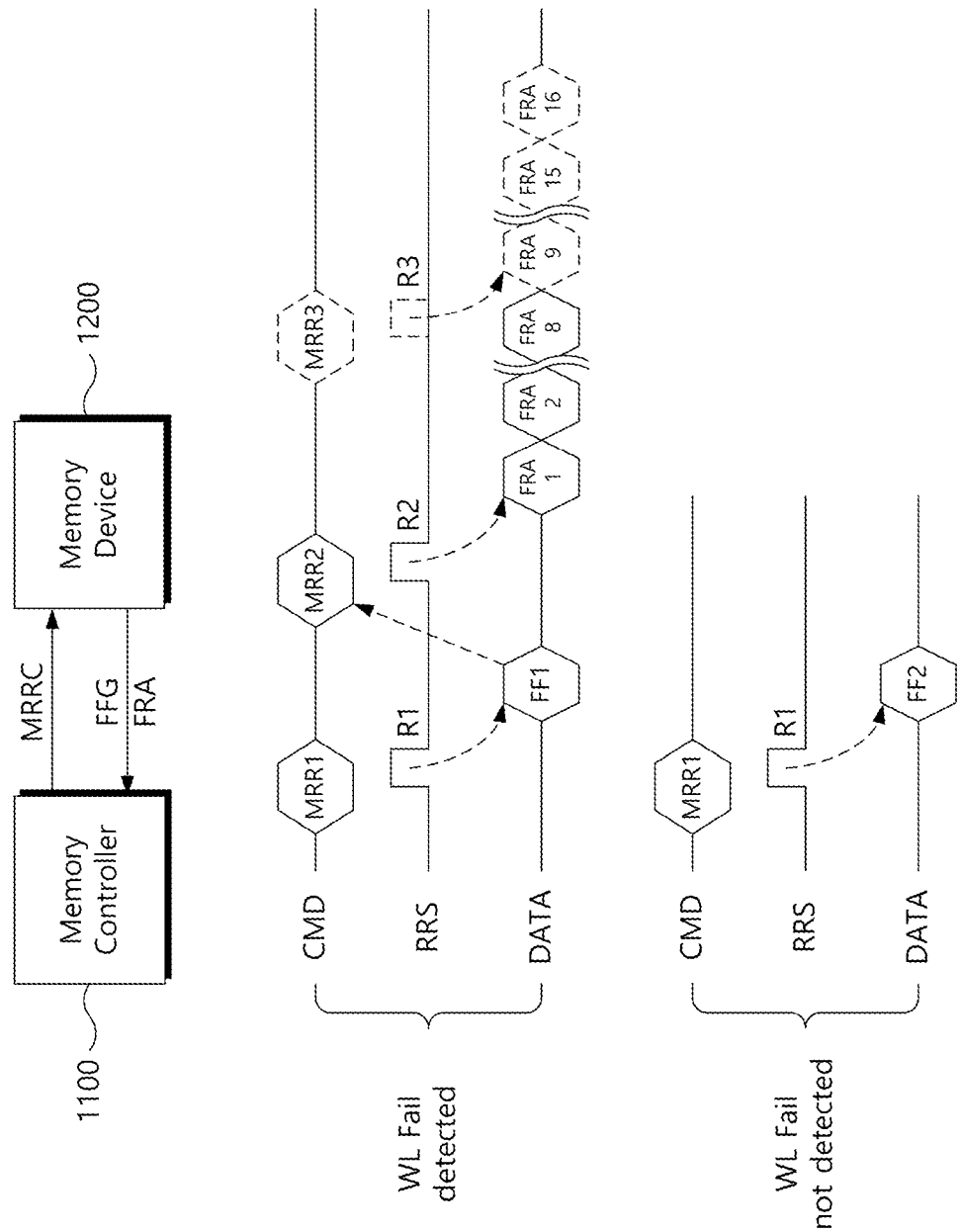
FIG. 7 is a timing diagram illustrating a memory defect identifying operation of a memory system of FIG. 3 according to some embodiments.

FIG. 7 is a timing diagram illustrating a memory defect identifying operation of a memory system of FIG. 3. Referring to FIGS. 3 and 7, the memory controller 1100 may transmit the mode register read command MRRC to the memory device 1200 through a command line. The memory device 1200 may transmit the fail flag FFG in response to the mode register read command MRRC and additionally transmit the fail row address FRA to the memory controller 1100 through a data line.

According to an embodiment, the memory controller 1100 may transmit a first mode register read command MRR1 to the memory device 1200. The memory device 1200 may transmit the fail flag FFG (e.g.,
the first fail flag FF1 or the second fail flag FF2) in response to the first mode register read command MRR1. The memory controller 1100 may determine whether a word line is defective based on the received fail flag FFG and may transmit the additional mode register read command MRRC. The memory device 1200 may activate a register read signal RRS when the mode register read command MRRC is received. The first mode register 1214 or the second mode register 1215 may output stored data based on the register read signal RRS.

According to an embodiment, when a memory cell connected to a word line has a defect, the memory device 1200 may activate a first register read signal R1 in response to the first mode register read command MRR1. The first mode register 1214 may output the first fail flag FF1 based on the first register read signal R1. The memory device 1200 may transmit the first fail flag FF1 to the memory controller 1200 through a data line. When the first fail flag FF1 is received, the memory controller 1200 may transmit a second mode register read command MRR2 to the memory device 1200 through a command line. The memory device 1200 may activate a second register read signal R2 in response to the second mode register read command MRR2. The second mode register 1215 may output the fail row address FRA (e.g., FRA1 to FRA8) corresponding to the first fail flag FF1 based on the second register read signal R2. The memory device 1200 may transmit the fail row address FRA to the memory controller 1100 through a data line.

Additionally (or alternatively), when the fail row address FRA is relatively long, the memory controller 1200 may transmit a third mode register read command MRR3 to the memory device 1200 through a command line. The memory device 1200 may activate a third register read signal R3 in response to the third mode register read command MRR3. The second mode register 1215 may output an additional fail row address 'extra' FRA (e.g., FRA9 to FRA16) corresponding to the first fail flag FF1 based on the third register read signal R3. The memory device 1200 may transmit the additional fail row address 'extra' FRA to the memory controller 1100 through a data line.

According to an embodiment, when a memory cell connected to a word line is not defective, the memory device 1200 may activate the first register read signal R1 in response to the first mode register read command MRR1. The first mode register 1214 may output the second fail flag FF2 based on the first register read signal R1. The memory device 1200 may transmit the second fail flag FF2 to the memory controller 1200 through a data line. When the second fail flag FF2 is received, the memory controller 1200 may determine that the word line is not defective, and may transmit the memory defect detection command DFT of FIG. 5 to the memory device 1200 after a specified time elapses.

As described above, the memory device 1200 may determine whether a memory cell connected to a word line is defective based on a leakage current of the word line. Accordingly, the memory device 1200 may determine whether a memory cell is defective through an I/O request (e.g., the mode register read command MRRC) for outputting a relatively small capacity fail flag and fail row address, rather than through a write operation and a read operation. Accordingly, the memory defect detection method of the memory device 1200 may reduce time and power consumption compared to a method of detecting a memory cell defect through a write operation and a read operation of the memory cell.

Figure 8:
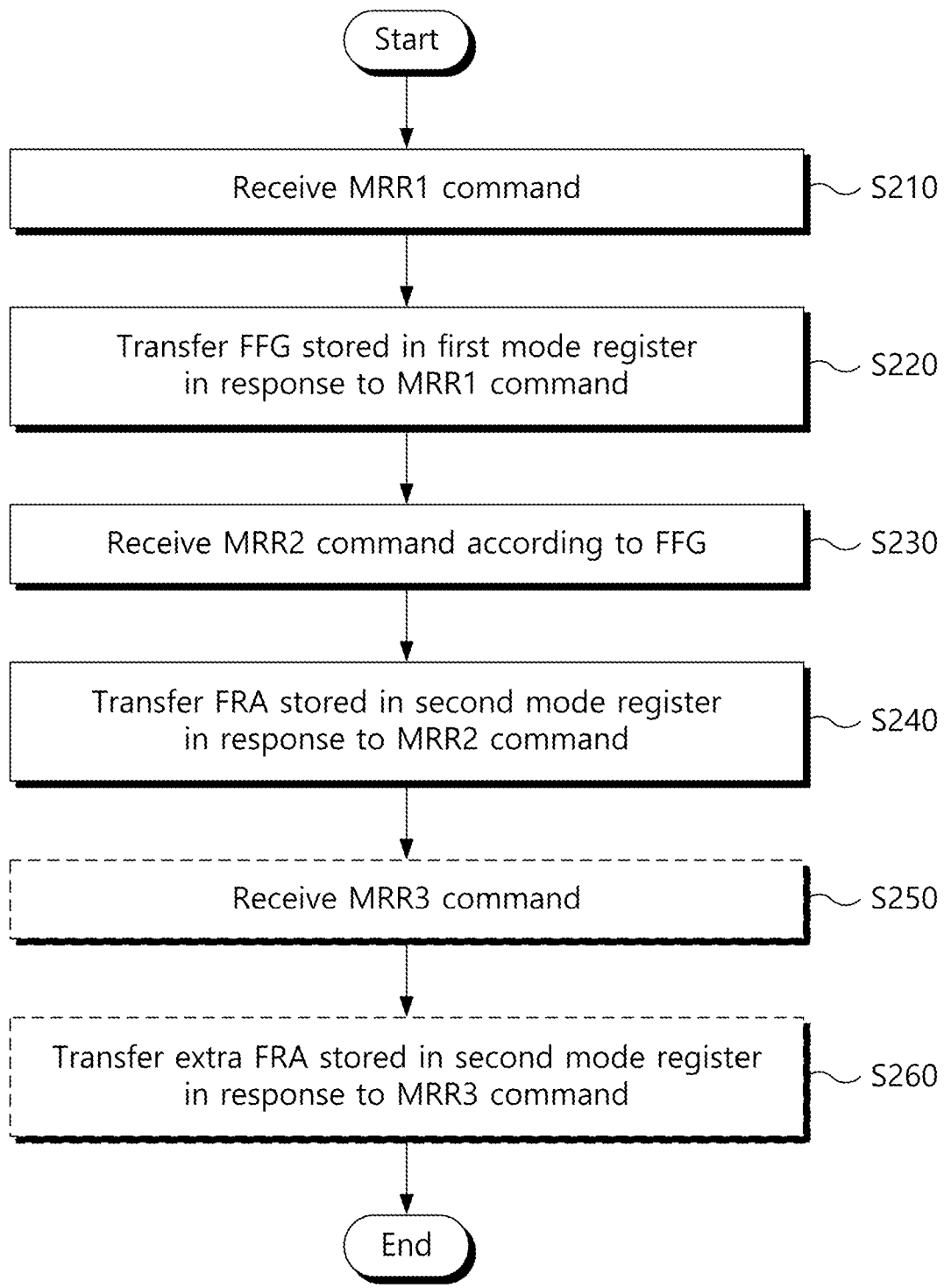
FIG. 8 is a flowchart illustrating a memory defect identifying operation of a memory system of FIG. 3 according to some embodiments.

FIG. 8 is a flowchart illustrating a memory defect identifying operation of a memory system of FIG. 3. Referring to FIGS. 3, 7, and 8, the memory controller 1100 may receive a result of a memory defect detection operation performed according to the memory defect detection command DFT.

According to an embodiment, in operation S210, the memory device 1200 may receive the first mode register read command MRR1. For example, after the memory defect detection command DFT of FIG. 5 is transmitted and a specified time elapses, the memory controller 1100 may transmit the first mode register read command MRR1 to the memory device 1200 through a command line.

According to an embodiment, in operation S220, the memory device 1200 may transmit the fail flag FFG stored in the first mode register 1214 in response to the first mode register read command MRR1. For example, the memory device 1200 may activate the first register read signal R1 in response to the first mode register read command MRR1. The first mode register 1214 may output the first fail flag FF1 or the second fail flag FF2 based on the first register read signal R1. When the voltage of the word line is equal to or less than the reference voltage VREF (i.e., when or indicating that a memory cell connected to the word line has a defect), the memory device 1200 may transmit the first fail flag FF1 stored in the first mode register 1214 to the memory controller 1100 through a data line. When the voltage of the word line exceeds the reference voltage VREF (i.e., when or indicating that the memory cell connected to the word line is not defective), the memory device 1200 may transmit the second fail flag FF2 stored in the first mode register 1214 to the memory controller 1100 through the data line.

According to an embodiment, in operation S230, the memory device 1200 may receive the second mode register read command MRR2. For example, the memory controller 1100 may determine whether a word line is defective based on the fail flag FFG transmitted in operation S220. When the first fail flag FF1 is received, the memory controller 1100 may determine that a memory cell connected to a word line is defective. The memory controller 1100 may transmit the second mode register read command MRR2 through a command line in response to the first fail flag FF1. However, when the second fail flag FF2 is received, the memory controller 1100 may determine that the memory cell connected to the word line is not defective. When it is determined that the memory cell connected to the word line is not defective, the memory controller 1100 may transmit the memory defect detection command DFT of FIG. 5 to the memory device 1200 after a specified time elapses.

According to an embodiment, in operation S240, the memory device 1200 may transmit the fail row address FRA stored in the second mode register 1215 in response to the second mode register read command MRR2. For example, when the second mode register read command MRR2 is received (or when a memory cell connected to a word line has a defect), the memory device 1200 may activate the second register read signal R2 in response to the second mode register read command MRR2. The second mode register 1215 may output the fail row address FRA (e.g., FRA1 to FRA8) corresponding to the first fail flag FF1 based on the second register read signal R2. The memory device 1200 may transmit the fail row address FRA to the memory controller 1100 through a data line.

According to an embodiment, in operation S250, the memory device 1200 may receive the third mode register read command MRR3. For example, operations S250 and S260 may be performed when the additional fail row address FRA exists. When the fail row address FRA is relatively long, after receiving the front part or first portion of the fail row address FRA (e.g., FRA1 to FRA8), the memory controller 1200 may additionally transmit the third mode register read command MRR3 to the memory device 1200 through the command line.

According to an embodiment, in operation S260, the memory device 1200 may transmit the additional fail row address FRA stored in the second mode register 1215 in response to the third mode register read command MRR3. For example, the memory device 1200 may activate the third register read signal R3 in response to the third mode register read command MRR3. The second mode register 1215 may output the additional fail row address 'extra' FRA (e.g., FRA9 to FRA16) corresponding to the first fail flag FF1 based on the third register read signal R3. The memory device 1200 may transmit the additional fail row address 'extra' FRA to the memory controller 1100 through a data line.

Figure 9:
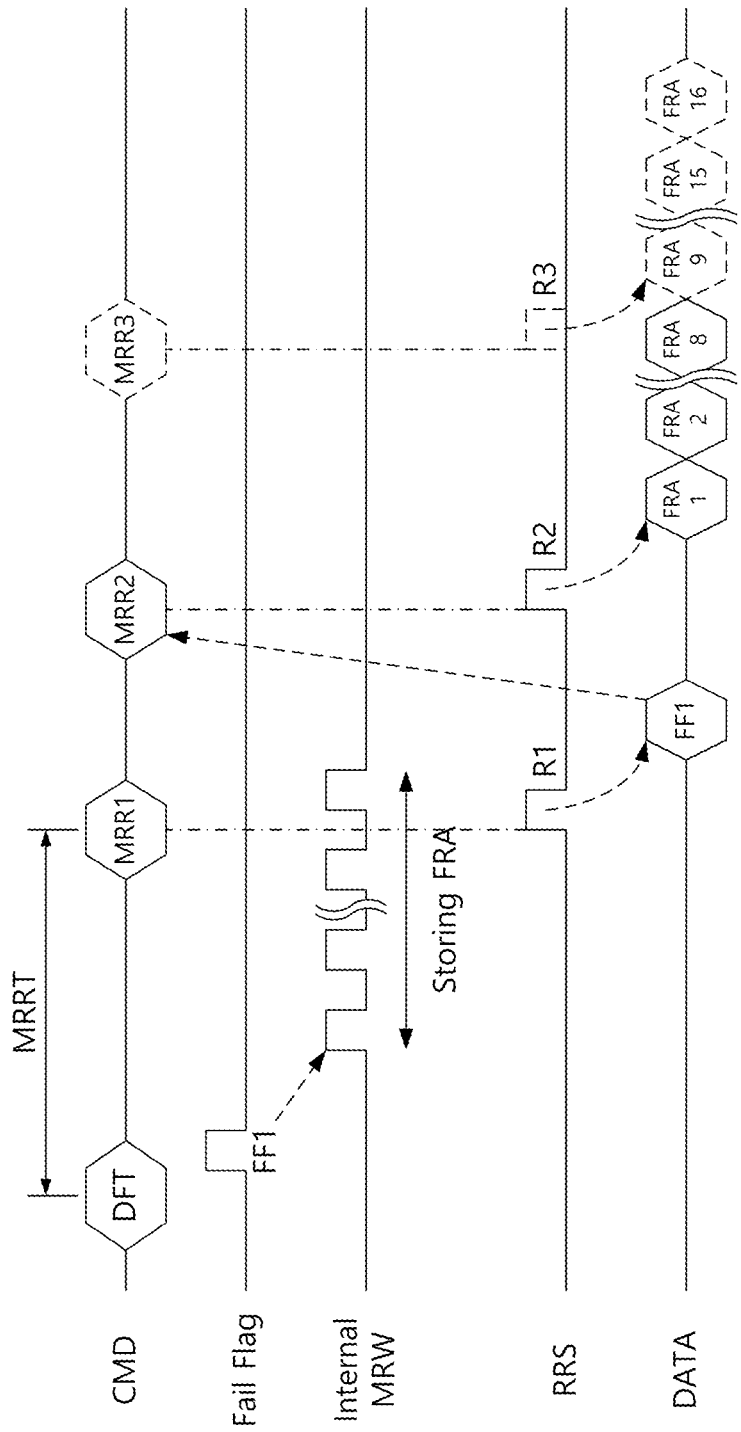
FIG. 9 is a timing diagram illustrating a memory defect detection operation of a memory system of FIG. 3 according to some embodiments.

FIG. 9 is a timing diagram illustrating a memory defect detection operation of a memory system of FIG. 3, according to various embodiments. Referring to FIGS. 3 and 9, the memory system 1000 may continuously perform the memory defect detection operation of FIG. 5 and the memory defect identifying operation of FIG. 7. FIG. 9 may illustrate an operation of the memory system 1000 when a word line fail is detected.

According to an embodiment, the memory controller 1100 may transmit the memory defect detection command DFT to the memory device 1200 through a command line. For example, when a memory defect is detected according to the method of FIG. 4, the word line defect detection circuit 1213 may output the first fail flag FF1 (e.g., logic 1). The first mode register 1214 may store the first fail flag FF1. The row decoder 1211 may transfer the fail row address FRA corresponding to the first fail flag FF1 to the second mode register 1215. The second mode register 1215 may store the fail row address FRA. In this case, the second mode register 1215 may perform a write operation of the fail row address FRA internally of the memory device 1200 regardless of the memory controller 1100.

According to an embodiment, the memory controller 1100 may transmit the first mode register read command MRR1 to the memory device 1200 after the memory defect detection command DFT is transmitted and a specified time (e.g., a mode register read time MRRT) elapses. For example, the mode register read time MRRT may be set in consideration of the time at which the second mode register 1215 stores the fail row address FRA. For example, the first mode register read command MRR1 may be transmitted to the memory device 1200 during a write operation of the fail row address FRA. Alternatively, the first mode register read command MRR1 may also be transmitted to the memory device 1200 after the write operation of the fail row address FRA is completed.

According to an embodiment, the memory device 1200 may activate the first register read signal R1 in response to the first mode register read command MRR1. The first mode register 1214 may output the first fail flag FF1 based on the first register read signal R1. The memory device 1200 may transmit the first fail flag FF1 to the memory controller 1200 through a data line. When the first fail flag FF1 is received, the memory controller 1200 may transmit a second mode register read command MRR2 to the memory device 1200 through a command line. The memory device 1200 may activate a second register read signal R2 in response to the second mode register read command MRR2. The second mode register 1215 may output the fail row address FRA (e.g., FRA1 to FRA8) corresponding to the first fail flag FF1 based on the second register read signal R2. The memory device 1200 may transmit the fail row address FRA to the memory controller 1100 through a data line.

Additionally (or alternatively), when the fail row address FRA is relatively long, the memory controller 1200 may transmit a third mode register read command MRR3 to the memory device 1200 through a command line. The memory device 1200 may activate a third register read signal R3 in response to the third mode register read command MRR3. The second mode register 1215 may output an additional fail row address 'extra' FRA (e.g., FRA9 to FRA16) corresponding to the first fail flag FF1 based on the third register read signal R3. The memory device 1200 may transmit the additional fail row address 'extra' FRA to the memory controller 1100 through a data line.

As described above, the memory device 1200 may detect whether a memory cell connected to a word line is defective based on the leakage current of the word line. Accordingly, the memory device 1200 may detect whether the memory cell is defective through the bank request (e.g., the memory defect detection command DFT) for activating a word line and the I/O request (e.g., the mode register read command MRRC) for outputting a relatively small capacity fail flag and fail row address, rather than through a write operation and a read operation. Accordingly, the memory defect detection method of the memory device 1200 may reduce time and power consumption compared to a method of detecting a memory cell defect through a write operation and a read operation of the memory cell.

Figure 10:
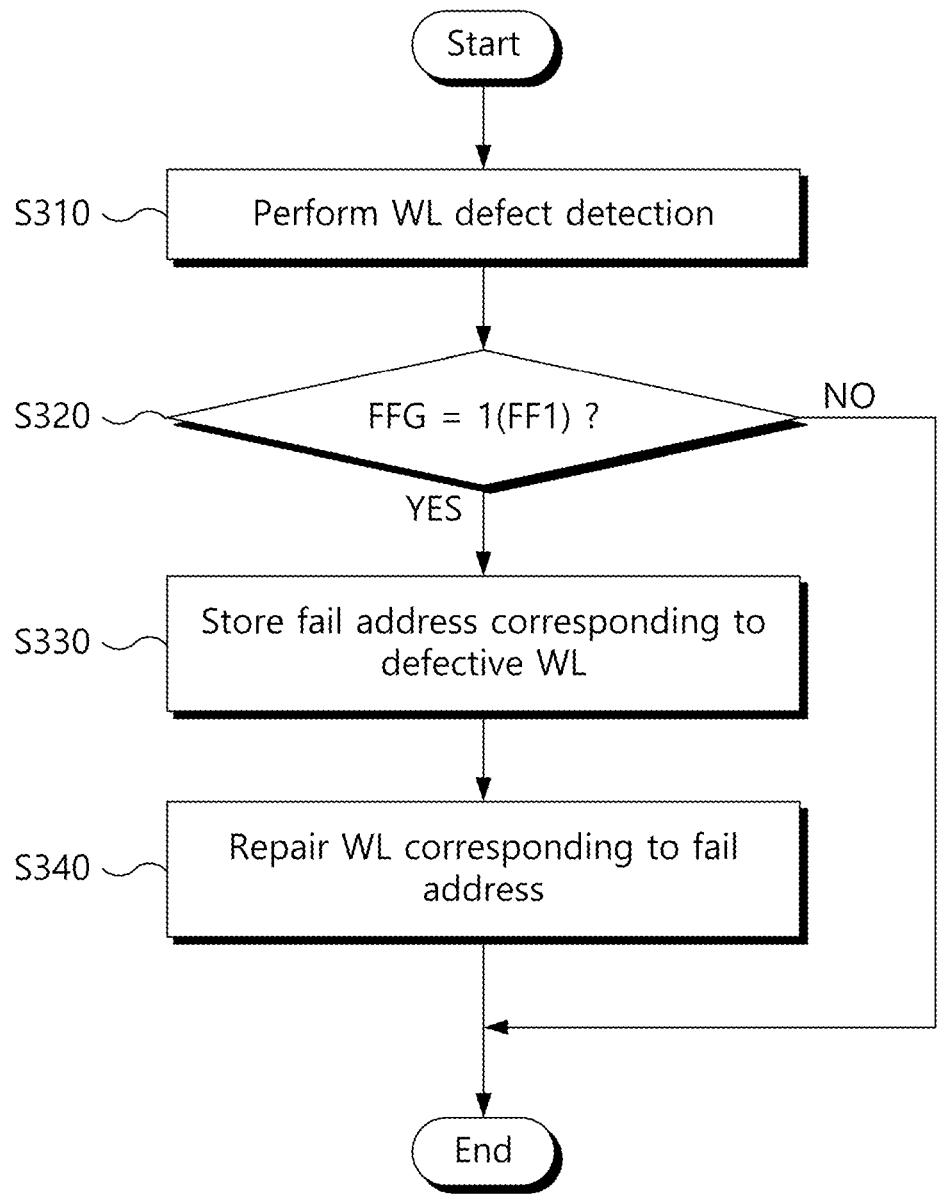
FIG. 10 is a flowchart illustrating a memory defect detection and restoring operation of a memory system of FIG. 3 according to some embodiments.

FIG. 10 is a flowchart illustrating a memory defect detection and restoring operation of a memory system of FIG. 3. Referring to FIGS. 3 to 10, the memory system 1000 may detect a defect related to a word line of the memory device 1200 and then perform a restoring operation on the fail word line.

According to an embodiment, in operation S310, the memory system 1000 may perform the word line defect detection operation. For example, the memory controller 1100 may periodically transmit the memory defect detection command DFT to the memory device 1200. When the memory defect detection command DFT is received, the word line defect detection circuit 1213 of the memory device 1200 may apply the input voltage VDD for each word line, and may compare the voltage of the word line with the reference voltage VREF. When the voltage of the word line is equal to or less than the reference voltage VREF, the word line defect detection circuit 1213 may output the first fail flag FF1 indicating a word line fail. When the voltage of the word line exceeds the reference voltage VREF, the word line defect detection circuit 1213 may output the second fail flag FF2 indicating that the word line is normal. The memory device 1200 may store the first fail flag FF1 or the second fail flag FF2 in the first mode register 1214. When the first fail flag FF1 is stored in the first mode register 1214, the memory device 1200 may store the fail row address FRA corresponding to the first fail flag FF1 to the second mode register 1215.

According to an embodiment, in operation S320, the memory system 1000 may determine word line defect information included in the fail flag FFG. For example, the memory controller 1100 may receive the first fail flag FF1 (e.g., logic 1) or the second fail flag FF2 (e.g., logic 0) in response to the first mode register read command MRR1. When the first fail flag FF1 is received, the memory controller 1200 may transmit the second mode register read command MRR2 to the memory device 1200. The memory controller 1100 may receive the fail row address FRA corresponding to the first fail flag FF1, which is provided in response to the second mode register read command MRR2.

According to an embodiment, in operation S330, when a fail word line exists, the memory system 1000 may store a defective address corresponding to the fail word line. For example, the memory controller 1100 may store and manage the fail row addresses FRA as a list.

According to an embodiment, in operation S340, the memory system 1000 may restore the word line corresponding to the defective address. For example, the memory controller 1100 may replace at least one memory cell corresponding to the fail row address FRA with a dummy memory cell. For example, the memory controller 1100 may map a logical address mapped to the fail row address FRA to a physical address corresponding to a dummy memory cell. The memory controller 1100 may allow the fail row address FRA to be blocked.

Figure 11:
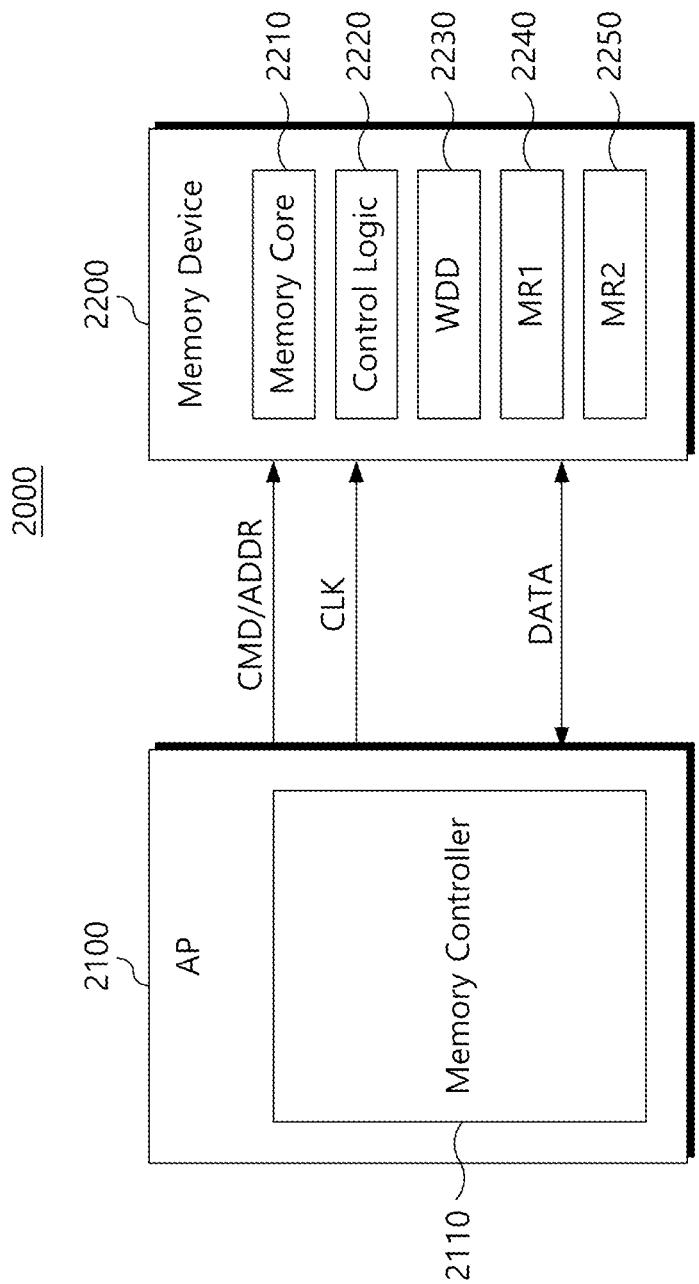
FIG. 11 is a diagram illustrating a mobile system according to some embodiments.

FIG. 11 is a diagram illustrating a mobile system, according to an embodiment. Referring to FIG. 11, a mobile system 2000 may include an application processor 2100 and the memory device 2200. The application processor 2100 may include the memory controller 2110. The memory device 2200 may include the memory core 2210 and the control logic 2220.

According to an embodiment, the memory controller 2110 may control the overall operation of the memory device 2200 by providing various signals to the memory device 2200. For example, the memory controller 2110 may control a memory access operation of the memory device 2200 such as a read operation and a write operation. The memory controller 2110 may provide the command CMD and the address ADDR to the memory device 1200 to write data DATA into the memory device 2200 or to read data DATA from the memory device 1200. In addition, the memory controller 2110 may further provide a clock signal CLK to the memory device 2200.

According to an embodiment, the memory device 2200 may output data DATA requested to be read by the memory controller 2110 to the memory controller 2110 or may store data DATA requested to be written by the memory controller 2110 in a memory cell. The memory device 2200 may input/output data DATA based on the command CMD, the address ADDR, and the clock signal CLK. The memory device 2200 may include the memory core 2210 and the control logic 2220. The memory core 2210 may include a memory cell array divided in units of banks. The memory cell array may include a plurality of memory banks.

According to an embodiment, the mobile system 2000 may perform the memory defect detection and restoring operations described in FIGS. 3 to 10. For example, the memory device 2200 may further include a word line defect detection circuit 2230, a first mode register 2240, and a second mode register 2250. The memory controller 2110 may transmit the memory defect detection command DFT to the memory device 2200 through a command line. When a memory defect is detected according to the method of FIG. 4, the word line defect detection circuit 2230 may output the first fail flag FF1 (e.g., logic 1). The first mode register 2240 may store the first fail flag FF1. The memory device 2200 may transfer the fail row address FRA corresponding to the first fail flag FF1 to the second mode register 2250. In this case, the second mode register 2250 may perform a write operation of the fail row address FRA internally of the memory device 2200 regardless of the memory controller 2110.

According to an embodiment, the memory controller 2110 may transmit the first mode register read command MRR1 to the memory device 2200 after the memory defect detection command DFT is transmitted and a specified time elapses. When the memory defect is detected according to the method of FIG. 4, the memory device 2200 may output the first fail flag FF1 stored in the first mode register 2240 in response to the first mode register read command MRR1. The memory device 2200 may transmit the first fail flag FF1 to the memory controller 2110 through a data line. When the first fail flag FF1 is received, the memory controller 2110 may transmit the second mode register read command MRR2 to the memory device 2200 through a command line. The memory device 2200 may output the fail row address FRA stored in the second mode register 2250 in response to the second mode register read command MRR2. The memory device 2200 may transmit the fail row address FRA to the memory controller 2110 through a data line.

According to an embodiment, when the memory defect is not detected according to the method of FIG. 4, the word line defect detection circuit 2230 may output the second fail flag FF2 (e.g., logic 0). The first mode register 2240 may store the second fail flag FF2. In this case, the memory device 2200 may not store anything (e.g., may not store a fail row address FRA) in the second mode register 2250. The memory controller 2110 may transmit the first mode register read command MRR1 to the memory device 2200 after the memory defect detection command DFT is transmitted and a specified time elapses. The memory device 2200 may transmit the second fail flag FF2 to the memory controller 2110 in response to the first mode register read command MRR1. When the second fail flag FF2 is received, the memory controller 2110 may determine that there is no memory defect and may not transmit the second mode register read command MRR2.

As described above, the memory device 2200 may detect whether a memory cell connected to a word line is defective based on the leakage current of the word line. Accordingly, the memory device 2200 may detect whether a memory cell is defective through the bank request (e.g., the memory defect detection command DFT) for activating a word line and/or the I/O request (e.g., the mode register read command MRRC) for outputting a relatively small capacity fail flag and a fail row address, rather than through a write operation and a read operation. Accordingly, the memory defect detection method of the memory device 2200 may reduce time and power consumption compared to a method of detecting a memory cell defect through a write operation and a read operation of the memory cell.

According to an embodiment of the present disclosure, time and power for detecting a fail memory cell may be reduced by detecting the fail memory cell without performing a write operation or a read operation of the memory device.

The above descriptions are specific embodiments for carrying out the present disclosure. Many variations may be included in the present disclosure as well as the embodiments described above. In addition, variations in technologies that are implemented by using the above embodiments may be included in the present disclosure. While the present disclosure has been described with reference to embodiments thereof, it will be apparent to those of ordinary skill in the art that various changes and modifications may be made thereto without departing from the scope of the present disclosure as set forth in the following claims.

What is claimed is:

1. A memory device comprising:
   a memory cell array including a plurality of memory cells;
   a word line defect detection circuit electrically connected to the memory cell array through a plurality of word lines; and
   control logic configured to control an input/output operation of the memory cell array, and
   wherein, responsive to receiving a memory defect detection command from a memory controller, the word line defect detection circuit is configured to provide an input voltage to a selected word line among the plurality of word lines, and to generate a fail flag based on a difference between a voltage of the selected word line and a reference voltage, and
   wherein, responsive to receiving a mode register read command from the memory controller, the control logic is configured to transmit the fail flag and a fail row address corresponding to the fail flag to the memory controller.

2. The memory device of claim 1, further comprising:
   a first mode register configured to store the fail flag; and
   a second mode register configured to store the fail row address.

3. The memory device of claim 2, wherein the word line defect detection circuit is configured to:
   store a first logic value of the fail flag in the first mode register responsive to the voltage of the selected word line being less than or equal to the reference voltage, and
   store a second logic value of the fail flag in the first mode register responsive to the voltage of the selected word line exceeding the reference voltage.

4. The memory device of claim 3, wherein the control logic is configured to store the fail row address in the second mode register responsive to storage of the first logic value of the fail flag in the first mode register.

5. The memory device of claim 3, wherein the control logic is configured to not store the fail row address responsive to storage of the second logic value of the fail flag in the first mode register.

6. The memory device of claim 3, wherein the control logic is configured to transmit the first fail flag having the first logic value or the fail flag having the second logic value stored in the first mode register to the memory controller responsive to receiving a first mode register read command.

7. The memory device of claim 6, wherein, responsive to receiving a second mode register read command after transmitting the fail flag having the first logic value in response to the first mode register read command, the control logic is configured to transmit the fail row address stored in the second mode register to the memory controller.

8. The memory device of claim 7, wherein, responsive to the fail row address being greater than a specified size, the control logic is configured to transmit an additional fail row address to the memory controller in response to receiving a third mode register read command after receiving the second mode register read command.

9. The memory device of claim 3, wherein, responsive to storage of the first logic value of the fail flag in the first mode register, the control logic is configured to internally perform a write operation of the fail row address associated with the second mode register independent of a command from the memory controller.

10. The memory device of claim 9, wherein the memory device is configured to receive the mode register read command from the memory controller after the memory defect detection command and after a specified time elapses, and
    wherein the specified time is based on a time required for a write operation of the fail row address.

11. A method of operating a memory device, the method comprising:
    receiving a memory defect detection command from a memory controller;
    generating a fail flag based on a difference between a voltage of a selected word line among a plurality of word lines of the memory device and a reference voltage in response to the memory defect detection command;
    storing the fail flag in a first mode register of the memory device; and
    storing a fail row address corresponding to the fail flag in a second mode register of the memory device.

12. The method of claim 11, further comprising:
    receiving a first mode register read command from the memory controller; and
    transmitting the fail flag stored in the first mode register to the memory controller in response to the first mode register read command.

13. The method of claim 12, further comprising:
    receiving a second mode register read command from the memory controller responsive to the fail flag indicating a word line fail; and
    transmitting the fail row address stored in the second mode register to the memory controller in response to the second mode register read command.

14. The method of claim 11, wherein the generating of the fail flag comprises:

generating the fail flag having a first logic value responsive to the voltage of the selected word line being less than or equal to the reference voltage; and generating the fail flag having a second logic value responsive to the voltage of the selected word line exceeding the reference voltage.

15. The method of claim 14, wherein the storing of the fail row address in the second mode register comprises:

storing the fail row address in response to storage of the first logic value of the fail flag in the first mode register; and not storing the fail row address responsive to storage of the second logic value of the fail flag in the first mode register.

16. A memory system comprising:

a memory device including a plurality of memory cells; and a memory controller configured to control an input/output operation of the memory device, and wherein the memory device is configured to perform a defect detection operation of the plurality of memory cells responsive to a memory defect detection command received from the memory controller, and to generate a fail flag indicating current leakage of one or more word lines electrically connected to the plurality of memory cells through the defect detection operation, and wherein the memory controller is configured to receive the fail flag or a fail row address corresponding to the fail flag from the memory device responsive to a mode register read command that is transmitted after the memory defect detection command and after a specified time elapses.

17. The memory system of claim 16, wherein the memory device is configured to:

select one of the word lines based on the memory defect detection command, store a first logic value of the fail flag in a first mode register responsive to a voltage of the one of the word lines that was selected being less than or equal to a reference voltage, store a second logic value of the fail flag in the first mode register responsive to the voltage of the one of the word lines that was selected exceeding the reference voltage, and store the fail row address in a second mode register responsive to storage of the first logic value of the fail flag in the first mode register.

18. The memory system of claim 17, wherein the memory device is configured to transmit the first fail flag having the first logic value or the fail flag having the second logic value responsive to receiving a first mode register read command, and wherein the memory controller is configured to transmit a second mode register read command responsive to receiving the fail flag having the first logic value in response to the first mode register read command.

19. The memory system of claim 18, wherein the memory device is configured to transmit the fail row address responsive to receiving the second mode register read command.

20. The memory system of claim 16, wherein the memory controller is configured to restore a fail memory cell of the memory device based on the fail row address by mapping a logical address that was mapped to the fail row address to a physical address corresponding to a dummy memory cell.

* * * * *